United States Patent Office 3,205,280
Patented Sept. 7, 1965

3,205,280
DEHYDROGENATION PROCESS
Freddy Wattimena and Willem F. Engel, both of Amsterdam, Netherlands, assignors to Shell Oil Company, New York, N.Y., a corporation of Delaware
No Drawing. Filed Oct. 10, 1961, Ser. No. 144,065
Claims priority, application Great Britain, Oct. 14, 1960, 35,280/60
6 Claims. (Cl. 260—680)

The present invention relates to processes for the dehydrogenation of hydrocarbon materials. More particularly, it relates to the preparation of hydrocarbon materials. More particularly, it relates to the preparation of hydrocarbon materials of greater unsaturation than the starting materials from which they are produced. Specifically, it is concerned with the conversion of aliphatic, saturated or olefinic unsaturated, hydrocarbons into mono- and poly-olefinic compounds corresponding thereto. Specifically included within the scope of the invention is a dehydrogenation process for the conversion of butane or butenes into butadiene.

Processes for the dehydrogenation of hydrocarbons by means of reactions involving the use of iodine in connection therewith are now known in the art. Moreover, it is known that hydrogen iodide formed during the course of the reaction may be reconverted into iodine in the reaction zone, through the use of oxygen. Processes involving the foregoing reactions are generally accomplished by passing a mixture of components in the gas phase through a reaction zone which is maintained at elevated temperatures. The use of inert contact materials, such as, for example, glass beads, quartz chips, and the like, is also well known.

Additionally, the art teaches the use of various heavy metal oxides as suitable catalysts for the dehydrogenation of hydrocarbons, particularly when halogens are absent. Furthermore, it is known to employ catalysts which contain, in addition thereto, an oxide of an alkali or alkaline earth metal, as for example, $Fe_2O_3$ with $K_2O$.

However, while the art is rather voluminous with regard to catalytic conversions of olefins to diolefins, there remains considerable interest in and need for catalytic processes involving the dehydrogenation of saturated organic material such as paraffinic hydrocarbons. In addition to disclosing a process for such conversion, the present invention also sets forth means whereby paraffinic and olefinic hydrocarbons may be dehydrogenated in appreciably greater yields than has heretofore been accomplished.

In accordance with the present invention, a paraffinic or an olefinicially unsaturated hydrocarbon or a mixture thereof is dehydrogenated by a process which comprises contacting the hydrocarbon feed in the vapor phase and in admixture with oxygen and a halogen with a solid catalyst comprising an alkali metal or alkaline earth metal compound.

The present invention therefore provides for the production of alkenes from alkanes, as well as the production of alkadienes and alkapolyenes from both alkanes and alkenes. Also it has been found that alicyclic hydrocarbons undergo similar conversion to cyclic olefins and/or aromatics. The removal of hydrogen atoms is often accomplished by the formation of new bonds between carbon atoms originally not connected with each other. Thus, an acyclic hydrocarbon may be transformed into a carbocyclic compound, as, for example, an aromatic hydrocarbon. Similarly, a monocyclic compound containing an acyclic group in the molecule may be converted to a dicyclic compound. Moreover, two radicals formed by the abstraction of hydrogen atoms may be combined to produce a new molecule. The foregoing reactions are illustrated by the following examples of the present invention but not as limitations thereto: n-butanes are formed from n-butane; butadiene from both n-butane and n-butenes; isobutene from isobutane; pentadienes from both pentanes and pentenes; benzene from hexane, toluene from n-heptane; naphthalene from butyl cyclohexane; diallyl from propene; and dibenzyl and stilbene from toluene. In certain instances the dehydrogenation is also accomplished by other reactions such as, for example, isomerization, dealkylation, and exchange of hydrogen atoms or alkyl groups between different hydrocarbon molecules.

The process of the invention is applicable generally to hydrocarbons having two or more carbon atoms in the molecule. Starting materials which are particularly suited are those aliphatic hydrocarbons having a carbon chain of four C-atoms in the molecule, for example, n-butane, 1- and 2-butene, or isopentane. It is often advantageous to employ mixtures of paraffins with the corresponding olefins, such as certain refinery fractions which consist predominantly of n-butane and the butenes. Usually it is advisable to recycle those hydrocarbons which either have not, or have only partly been converted in one pass. Thus, in the preparation of butadiene from butane and/or the butenes, the unconverted compounds are passed again into the reactor, together with new feed, after having recovered butadiene from the stream of products leaving the reactor.

In carrying out the process of the invention the gaseous mixture of the hydrocarbon is dehydrogenated by passing it with oxygen and a halogen over a suitable solid catalyst. Instead of pure oxygen a molecular oxygen-containing gas, such as air, is usually preferred. The amount of oxygen to be applied depends in general upon the hydrocarbon which is to be dehydrogenated and also on the particular product which it is desired to prepare preferentially. In other words, approximately stoichiometric amount of oxygen should be employed in theory, in accordance with the number of hydrogen atoms which are to be removed from the hydrocarbon and oxidized to water. For example, 1 mole of butane requires 1 mole of oxygen for the conversion into butadiene, i.e., twice the amount needed to convert butene. In practice, 0.5 to 1.5 of the theoretical amount of oxygen is preferably used.

The halogen is preferably bromine or iodine. Particularly preferred is iodine. The halogen may be supplied in the form of a suitable halogen-containing compound, which can yield the elemental halogen under the conditions of the reaction. The halogen may thus be formed, for example, from the corresponding hydrogen halide, e.g., the iodide, or a halohydrocarbon. In the latter case, a halogen derivative of the hydrocarbon to be dehydrogenated is suitably employed, such as butyl iodide in the dehydrogenation of butane. When part of the reaction products are recycled in the process, they will usually contain halogenated products, e.g., hydrogen iodide, alkyl iodides, etc.

The amount of halogen which is used may vary within relatively wide limits. Owing to economic considerations, however, it is preferable to use as small an amount of halogen as possible. An important advantage of the present invention is that the dehydrogenation process may be carried out in the presence of only very small amounts of the halogen, which are appreciably lower than would stoichiometrically be required. The halogen therefore may be considered as acting merely as a catalyst, and even traces thereof will in many cases suffice to catalyze the reaction. In such cases, regeneration of the halogen for re-use is not required and may be omitted. Generally, it is preferable to employ the halogen in quantities less than 0.1 mole per mole of the hydrocarbon feed. The amount of halogen is suitably between 0.001 to 0.09 mole per mole of hydrocarbon, and preferably between 0.01 and 0.06 mole per mole of the hydrocarbon. Excellent results have been achieved in the foregoing range when one or two new C—C= bonds were introduced into the molecule, as in the conversion of butanes and butenes into butadiene. When, however, the formation of a larger number of bonds is involved, e.g., in the preparation of benzene from n-hexane, the relative quantities of halogen should be somewhat higher.

The presence of inert diluents, for example, nitrogen or water, in the gaseous feed mixture has often been found to have a beneficial effect on the conversion as well as on the selectivity, particularly when di- or poly-olefins are to be produced. Very satisfactory results have been obtained by using steam as the diluent. Although the desirable amount of steam depends on the particular hydrocarbon to be dehydrogenated and on the reaction conditions, the admixture of between 1 and 10 moles of water per mole of the hydrocarbon, and preferably between 2 and 6 moles per mole, is generally preferred.

The temperature at which the dehydrogenation is carried out may be between about 375 and 1000° C. It is generally preferable, however, not to exceed 650° C. Temperatures of between about 450° C. and 575° C., and especially between about 475° C. and 525° C., have been found to be very favorable. The reaction is conducted at ordinary pressures, although, if desired, higher or lower pressures may be employed.

In practicing the present invenion, the gaseous mixture is passed over the solid catalyst with space velocities which may vary between rataher wide limits. In most cases, however, space velocities of between 10 and 1000 liters per weight of catalyst per hour, and preferably between 20 and 100 liters per weight of catalyst per hour, have been found particularly suitable and advantageous. The space velocity is defined as the volumes of hydrocarbon feed at 0° C. and 1 atmosphere which pass through the reactor per hour per unit volume of the catalyst. The surface area of the catalyst is advantageously at least 1 square meter per gram, and generally does not exceed 500 square meters per gram.

It is to be understood that the process may be carried out either by passing the gas mixture over a solid bed of the catalyst, or in a fluidized reactor; such procedure being well understood by those skilled in the art. Particularly favorable results have been obtained through the use of a fluidized reactor. Moreover, the catalytic material may be present entirely or partly in the form of a melt. When in these cases a carrier is used, the pore diameter may not become too small by the wetting of the inner walls of the pores, as otherwise these would be inaccessible to the reacting gas mixture.

The catalyst according to the invention is preferably supported on a carrier. Various materials, such as pumice or ceramic material may be employed, but by far the best results are obtained with alumina and/or silica, e.g., silica gel. The amount of the catalyst present may be very small. Even traces of the compounds in question are sufficient to catalyze the reaction. Preferably, however, at least 0.80 millimole of the catalyst should be present per gram of the carrier. Excellent results are obtained when 1.0 millimole or more, and particularly at least 1.4 millimoles of the catalyst are present per gram of the carrier.

The solid catalyst should consist of or contain one or more alkali metal and/or alkaline-earth metal compounds. Examples are compounds derived from lithium, sodium, potassium, calcium, strontium or barium. Sodium or potassium compounds are particularly suitable. Simple compounds are usually preferred, e.g., oxides, hydroxides, carbonates, silicates or sulfates. Very good results have been obtained with halides, particularly bromides. An excellent catalyst is potassium bromide either alone or in admixture with other catalysts and/or promoters. Further examples are potassium chloride and potassium iodide. Frequently, even traces of these compounds are sufficient to catalyze the reaction.

The effect of the solid catalyst is appreciably enhanced if in addition one or more metal compounds derived from the transition elements of Groups I and IV to VIII of the Periodic Table and/or a rare-earth metal compound are also present. Good results have been obtained when using compounds such as the oxides or halides. Although the relative amounts of the alkali metals and/or alkaline-earth metal compounds(s) and the metal compound(s) of the transition elements of Groups I and IV to VIII and/or the compound(s) of the rare-earth elements may vary within wide limits, it is advisable to use catalysts wherein the atomic ratio of alkali and/or alkaline-earth metal to transition metal and/or rare-earth metal is not less than 1 and not more than 7. Catalysts wherein the atomic ratio mentioned above is between 3 and 5 are particularly preferred. Thus, very good results have been obtained when the atomic ratio of an alkali metal:transition metal:rare-earth metal was 4:1:1.

Examples of elements of the above-mentioned Groups I and IV to VIII which will give beneficial effects are zirconium, titanium, vanadium, chromium, molybdenum, manganese, tungsten, iron, cobalt, nickel, palladium, copper and silver. The compound used is preferably a bromide.

The compounds derived from metals of the rare-earth metal group are compounds of the elements having atomic numbers of from 57 to 71 as well as of scandium and yttrium. With respect to the rare-earth metal compounds it is recommended to use compounds of "didymium," e.g., the mixture known as "didymium oxide," which has approximately the following composition: 45% $La_2O_3$, 38% $Nd_2O_3$, 11% $Pr_6O_{11}$, 4% $Sm_2O_3$ and 2% residuals. The corresponding "didymium chloride" is particularly preferred.

A suitable solid catalyst (plus carrier) for the dehydrogenation of butene to butadiene has the following composition (in parts by weight): $Al_2O_3$ 90.2; $SiO_2$ 9.0; $Fe_2O_3$ 0.2; MgO 0.1; CaO 0.1; $Na_2O$ 0.1; $K_2O$ 0.1; and $TiO_2$ 0.2. A catalyst which was successfully used in the dehydrogenation of n-butane contained, in addition, 1.7 "didymium oxide," 0.6 $Na_2O$, and 1.4 $MoO_3$, the latter compounds as Na-molybdate. In another similar case, the additional compounds consisted of 11.4 $Bi_2O_3$ and 7.0 $MoO_3$ parts by weight. Excellent results were also obtained with a solid catalyst consisting of 100 $SiO_2$; 19.9 "didymium oxide"; 17.1 $MoO_3$ and 3.7 $Na_2O$ parts by weight.

Preferred catalysts are composed of potassium bromide, silver bromide, and didymium chloride, particularly when supported on a suitable carrier. Much improved conversions and selectivities to butadiene were achieved in all cases as compared with experiments carried out in the absence of a catalyst.

The catalyst which generally consists of a mixture of various components must be brought into a finely subdivided form. This may be effected by any of the known methods, e.g., mixing and grinding. When, however, the catalyst is used on a carrier, as is usually the case, a simple method consists in impregnating the carrier with a solution containing the catalytic material. Frequently catalyst components are used which are insoluble in water. In these cases one may start from the solution of a corresponding pre-catalyst from which the desired catalyst may be precipitated by means of a suitable precipitating agent. The carrier with the supported catalytic material is subsequently dried. In other cases a pre-catalyst is brought on the carrier and converted in situ into the desired compound(s) by treatment with an appropriate reagent, e.g., HBr, and/or by calcination. Thus, a carrier is impregnated with one or more nitrates, and the latter are entirely or partly converted into the corresponding oxides by calcination. Usually the feed mixture used contains active reagents, such as hydrogen iodide, which bring about conversion in situ of the catalytic material originally present on the carrier.

The dehydrogenation products obtained according to the invention are important chemicals which may for example be used in the preparation of high polymers.

EXAMPLES

Preparation of the catalyst

The carrier material was calcined at 900° C. during 24 hours before use. It was then impregnated with an aqueous solution containing the catalyst or the components thereof in the form of the soluble salt(s). The impregnated carrier was dried first on a steam bath with continuous stirring, and subsequently in a furnace at 550° C. for 5 hours. Insoluble catalysts were precipitated on the carrier, e.g., $AgNO_3 + HBr \rightarrow AgBr$.

The composition of the catalysts reported in the following examples is expressed as percent by weight calculated on the carrier. The experiments described in Examples I–VIII were carried out using a fixed bed reactor.

EXAMPLE I.—CONVERSION OF BUTANE TO BUTENE AND BUTADIENE

A gaseous mixture containing butane, air, iodine and steam in a molar ratio of 1:4.76:0.04:2.9 was fed over various catalysts at a reactor temperature of 500° C. and with a space velocity of 30. The catalyst was supported in alpha-$Al_2O_3$.

TABLE I

| Contact material | Total conversion butane, percent mol | Selectivity | |
|---|---|---|---|
| | | $C_4H_8$ | $C_4H_6$ |
| Quartz wool | 25.4 | 41.3 | 9.1 |
| 2.08 KBr—100 alpha-$Al_2O_3$ | 58.6 | 3.8 | 66.7 |
| 2.08 KBr—1.09 DiCl$_3$—100 alpha-$Al_2O_3$ | 61.1 | 8.0 | 67.4 |
| 2.08 KBr—0.82 AgBr—100 alpha-$Al_2O_3$ | 55.7 | 2.3 | 65.7 |
| 2.08 KBr—1.09 DiCl$_3$—0.82 AgBr—100 support | 61.6 | 3.6 | 79.1 |

An appreciable effect is obtained when the catalyst contains in addition to the alkali metal compound both a compound of a transition element and a rare-earth metal compound.

EXAMPLE II.—EFFECT OF IODINE

A gaseous mixture containing butane or butene, air and steam in a molar ratio of 1:4.76:2.9 was used as the reactor feed. To this feed iodine vapor was added. The reaction temperature was 500° C.

The catalyst had the following composition: 4.80 KI, 0.36 DiCl$_3$, 3.40 AgI, supported on 100 alpha-$Al_2O_3$.

TABLE II

| Feed | Contact material | Space Velocity of hydrocarbon | Molar ratio $I_2/C_4$ hydrocarbon | Total conversion, $C_4$ hydrocarbon, percent mol | Selectivity | |
|---|---|---|---|---|---|---|
| | | | | | $C_4H_8$ | $C_4H_6$ |
| $C_4H_{10}$ | Quartz wool | 30 | 0.04 | 25.4 | 41.3 | 9.1 |
| $C_4H_{10}$ | Catalyst | 30 | 0 | 25.3 | 11.8 | 40.2 |
| $C_4H_{10}$ | do | 30 | 0.04 | 63.0 | 4.9 | 72.5 |
| 1-$C_4H_8$ | Quartz wool | 30 | 0 | 49.5 | | 3.6 |
| 1-$C_4H_8$ | do | 30 | 0.005 | 42.9 | | 30.8 |
| 1-$C_4H_8$ | Catalyst | 40 | 0 | 29.9 | | 81.1 |
| 1-$C_4H_8$ | do | 40 | 0.002 | 91.6 | | 90.3 |

Quartz wool alone even gives a conversion, which is appreciably higher when starting from butene than from butane.

EXAMPLE III.—EFFECT OF THE TYPE OF HALIDE

The same reaction conditions and the same carrier material were used as in Example I.

TABLE III

| Contact material | Total conversion butane, percent mol | Selectivity | |
|---|---|---|---|
| | | $C_4H_8$ | $C_4H_6$ |
| 2.08 KBr—1.09 DiCl$_3$—0.82 AgBr—100 support | 61.6 | 3.6 | 79.1 |
| 2.08 KBr—1.09 DiCl$_3$—0.63 AgCl—100 support | 57.8 | 2.9 | 72.0 |
| 2.08 KBr—1.09 DiCl$_3$—1.02 AgI—100 support | 61.6 | 5.8 | 74.4 |
| 2.90 KI—1.09 DiCl$_3$—1.02 AgI—100 support | 63.6 | 8.2 | 66.5 |
| 1.30 KCl—1.09 DiCl$_3$—1.02 AgI—100 support | 61.8 | 5.8 | 66.8 |
| 1.30 KCl—1.09 DiCl$_3$—0.63 AgCl—100 support | 62.6 | 13.3 | 59.4 |

EXAMPLE IV.—EFFECT OF VARIATION OF THE TRANSITION METAL COMPOUNDS

The same reaction conditions were used as in Example I. The carrier material was the same as in the foregoing examples.

| Contact material | Total conversion butane, percent mol | Selectivity | |
|---|---|---|---|
| | | $C_4H_8$ | $C_4H_6$ |
| 1.30 KCl—1.09 DiCl$_3$—1.02 AgI—100 support | 61.8 | 5.8 | 66.8 |
| 1.30 KCl—1.09 DiCl$_3$—0.63 MoO$_3$—100 support | 60.2 | 8.0 | 67.4 |
| 1.30 KCl—1.09 DiCl$_3$—1.02 WO$_3$—100 support | 58.5 | 3.2 | 63.1 |
| 1.30 KCl—1.09 DiCl$_3$—0.53 ZrO$_2$—100 support | 60.1 | 9.3 | 66.4 |
| 1.30 KCl—1.09 DiCl$_3$—0.78 Mn(NO$_3$)$_2$—100 support | 52.3 | 12.6 | 59.9 |
| 1.30 KCl—1.09 DiCl$_3$—0.80 Co(NO$_3$)$_2$—100 support | 58.5 | 3.6 | 70.3 |
| 1.30 KCl—1.09 DiCl$_3$—1.10 Fe(NO$_3$)$_3$—100 support | 57.9 | 3.1 | 72.7 |
| 1.30 KCl—1.09 DiCl$_3$—0.80 Ni(NO$_3$)$_2$—100 support | 58.5 | 1.9 | 68.9 |
| 1.30 KCl—1.09 DiCl$_3$—0.78 PdCl$_2$—100 support | 56.0 | 2.0 | 75.2 |
| 1.30 KCl—1.09 DiCl$_3$—0.59 CuCl$_2$—100 support | 58.0 | 12.1 | 63.4 |

Equimolecular amounts of the various transition metal compounds were tested.

EXAMPLE V.—EFFECT OF THE AMOUNT OF CATALYST PRESENT ON THE CARRIER

The same reaction conditions and the same carrier were used as in Example I.

TABLE V

| Catalyst | Total conversion butane, percent mol | Selectivity | |
|---|---|---|---|
| | | $C_4H_8$ | $C_4H_6$ |
| 2.60 KCl—2.18 DiCl$_3$—1.26 MoO$_3$—100 support | 55.7 | 3.2 | 71.1 |
| 1.30 KCl—1.09 DiCl$_3$—0.63 MoO$_3$—100 support | 60.2 | 8.0 | 67.4 |
| 0.65 KCl—0.54 DiCl$_3$—0.32 MoO$_3$—100 support | 59.3 | 9.1 | 61.7 |

EXAMPLE VI.—USE OF HI FROM WHICH IODINE IS GENERATED UNDER THE REACTION CONDITIONS

The same reaction conditions and the same carrier were used as in Example I. The composition of the catalyst was as follows: 2.60 KCl, 1.26 MoO$_3$, supported on 100 carrier.

TABLE VI

| Iodine species | Molar ratio, air/butane | Total conversion butane, percent mol | Selectivity | |
|---|---|---|---|---|
| | | | $C_4H_8$ | $C_4H_6$ |
| $I_2$ | 4.76 | 46.9 | 3.8 | 66.7 |
| HI | 4.86 | 48.9 | 3.7 | 66.3 |

EXAMPLE VII.—EFFECT OF THE MOLAR RATIO IODINE/BUTANE

A gaseous mixture of butane, air, and steam in a molar ratio of 1:5.84:2 was fed together with iodine over the catalyst at a reactor temperature of 520° C. and with a space velocity of 40. The test was carried out in a continuous run of 120 hours. The catalyst used had the same composition as in Example II.

TABLE VII

| Iodine/butane, molar ratio | Total conversion butane, percent mol | Selectivity | |
|---|---|---|---|
| | | $C_4H_8$ | $C_4H_6$ |
| 0 | 16.9 | 33.2 | 32.7 |
| 0.0005 | 18.2 | 26.9 | 34.8 |
| 0.001 | 29.8 | 18.2 | 46.5 |
| 0.002 | 40.0 | 13.5 | 42.3 |
| 0.005 | 48.5 | 8.0 | 47.2 |
| 0.01 | 52.3 | 9.2 | 52.3 |
| 0.04 | 69.4 | 10.0 | 68.8 |

EXAMPLE VIII.—CATALYST LIFE

A gaseous mixture of butane, air, hydrogen iodide and steam in a molar ratio of 1:4.86:0.08:3 was passed over the catalyst at reactor temperatures of 485° C. and 500° C. and with a space velocity of 28.5. The composition of the catalyst was the same as in Example II.

TABLE VIII

| Run hours | Reactor temperature, °C | Total conversion butane, percent mol | Selectivity | |
|---|---|---|---|---|
| | | | $C_4H_8$ | $C_4H_6$ |
| 20 | 485 | 50.8 | 1.6 | 70.1 |
| 92 | 485 | 51.2 | 3.9 | 65.4 |
| 185 | 485 | 48.0 | 6.3 | 68.6 |
| 289 | 485 | 53.8 | 10.2 | 65.1 |
| 355 | 485 | 48.8 | 6.1 | 62.1 |
| 450 | 500 | 64.1 | 11.9 | 63.2 |
| 523 | 500 | 60.3 | 8.1 | 68.7 |
| 650 | 500 | 62.3 | 9.5 | 63.2 |
| 792 | 500 | 60.3 | 8.8 | 65.5 |

*Dehydrogenations in a fluidized bed reactor*

The experiments described in Examples IX–XI were carried out using a fluidized bed reactor.

EXAMPLE IX.—CONVERSION OF BUTANE TO BUTENE AND BUTADIENE

The catalyst had the following composition: 6.38 KBr, 3.15 AgI, 3.34 DiCl₃, supported on 100 Al₂O₃. The carrier material was a sintered alumina.

The particles of the contract material were held in a fluidized state by passing a gaseous mixture of butane, oxygen, nitrogen, iodine, and steam through the catalyst bed. The reaction temperature was 525° C. and a space velocity of 80 was used.

TABLE IX

| Molar ratio, reactor feed $C_4H_{10}:O_2:I_2:N_2:H_2O$ | Total conversion butane, percent mol | Selectivity | |
|---|---|---|---|
| | | $C_4H_8$ | $C_4H_6$ |
| 1:1:0.04:4:4 | 74.9 | 3.6 | 88.5 |
| 1:0.75:0.04:4:4 | 62.4 | 10.7 | 82.0 |

EXAMPLE X.—CONVERSION OF ETHANE TO ETHENE

The catalyst used had the following composition: 6.38 KBr, 2.52 AgBr, 3.34 DiCl₃, supported on 100 Al₂O₃. The carrier was the same as in Example IX. The reaction temperature was 575° C. The other reaction conditions were the same as in Example IX.

TABLE X

Total conversion ethane, percent mol _____ 85.7
Selectivity, $C_2H_4$ _____ 75.7

EXAMPLE XI.—CONVERSION OF ETHYLENE TO ACETYLENE

The same catalyst and the same reaction conditions were used as in Example X, with the exception that the reaction temperature was 800° C.

TABLE XI

Total conversion ethylene, percent mol _____ 76.1
Selectivity, $C_2H_2$ _____ 27.9

While the foregoing descriptions and examples are offered herein for purposes of exposition of the process of the present invention, it is intended that the invention be limited only as set forth by the spirit and scope of the appended claims.

We claim as our invention:

1. The process for the catalytic dehydrogenation of a first hydrocarbon selected from the group consisting of paraffins and olefins to a corresponding less saturated second hydrocarbon, consisting essentially of reacting said first hydrocarbon, in the vapor phase, at a temperature of from about 375° to about 1000° C., with a halogen selected from the group consisting of bromine and iodine, in a mole ratio of said halogen to said first hydrocarbon in the range of from about 0.001:1 to about 0.09:1, in the presence of added free oxygen, and of a solid catalyst consisting essentially of an alkali metal halide in combination with from about 1 to about 7 moles of silver halide, and in the additional presence of from about 1 to about 7 moles per mol of said alkali metal halide of at least one member of the group consisting of the oxides and halides of zirconium, titanium, vanadium, chromium, molybdenum, manganese, tungsten, iron, cobalt, nickel, palladium and copper.

2. The process in accordance with claim 1 wherein said solid catalyst is employed in combination with a rare earth metal.

3. The process in accordance with claim 1 wherein said solid catalyst consists of potassium bromide in combination with from about 1 to about 7 moles of silver bromide per mole of said potassium bromide.

4. The process in accordance with claim 3 wherein said process is executed in the additional presence of from about 1 to about 7 moles of didymium chloride per mole of potassium bromide present.

5. The process in accordance with claim 1 wherein said process is executed at temperature of from about 450° to about 575° C.

6. The process in accordance with claim 1 wherein said catalyst is employed in further combination with a catalyst support consisting of at least one member of the group consisting of silica and alumina.

References Cited by the Examiner

UNITED STATES PATENTS

| | | | |
|---|---|---|---|
| 2,308,489 | 1/43 | Cass | 260—654 |
| 2,370,513 | 2/45 | Amos | 260—680 |
| 2,434,888 | 1/48 | Rust et al. | 260—604 |
| 2,643,269 | 6/53 | Augustine | 260—604 |
| 2,879,300 | 3/59 | Cheney et al. | 260—604 |
| 2,971,995 | 2/61 | Arganbright | 260—683.3 |
| 3,028,440 | 4/62 | Arganbright | 260—680 |
| 3,080,435 | 3/63 | Nager | 260—680 |
| 3,106,590 | 10/63 | Bittner | 260—680 |
| 3,130,241 | 4/64 | Baijle et al. | 260—680 |

OTHER REFERENCES

Moeller: "Inorganic Chemistry," John Wiley & Sons, Inc., New York, 1952, pp. 102–106.

ALPHONSO D. SULLIVAN, *Primary Examiner.*

PAUL M. COUGHLAN, *Examiner.*